May 20, 1941.　　　G. S. CROOME　　　2,242,348
ANTISKID DEVICE FOR AUTOMOBILES
Filed Aug. 2, 1940　　　3 Sheets-Sheet 1
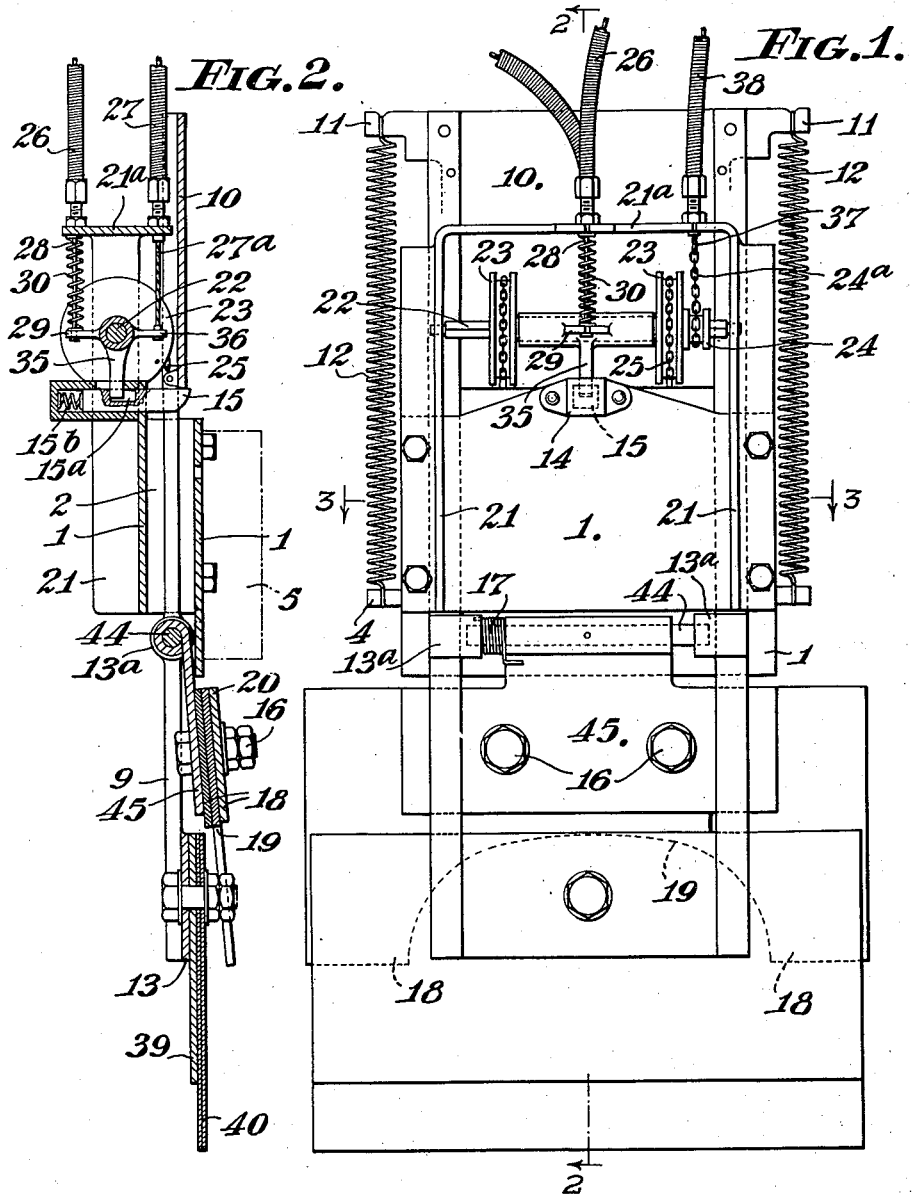
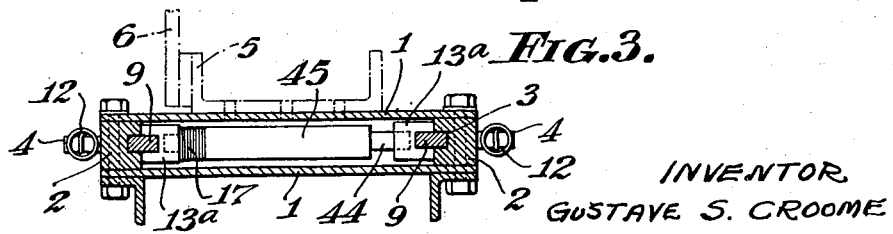
INVENTOR,
GUSTAVE S. CROOME May 20, 1941.     G. S. CROOME     2,242,348
ANTISKID DEVICE FOR AUTOMOBILES
Filed Aug. 2, 1940     3 Sheets-Sheet 2
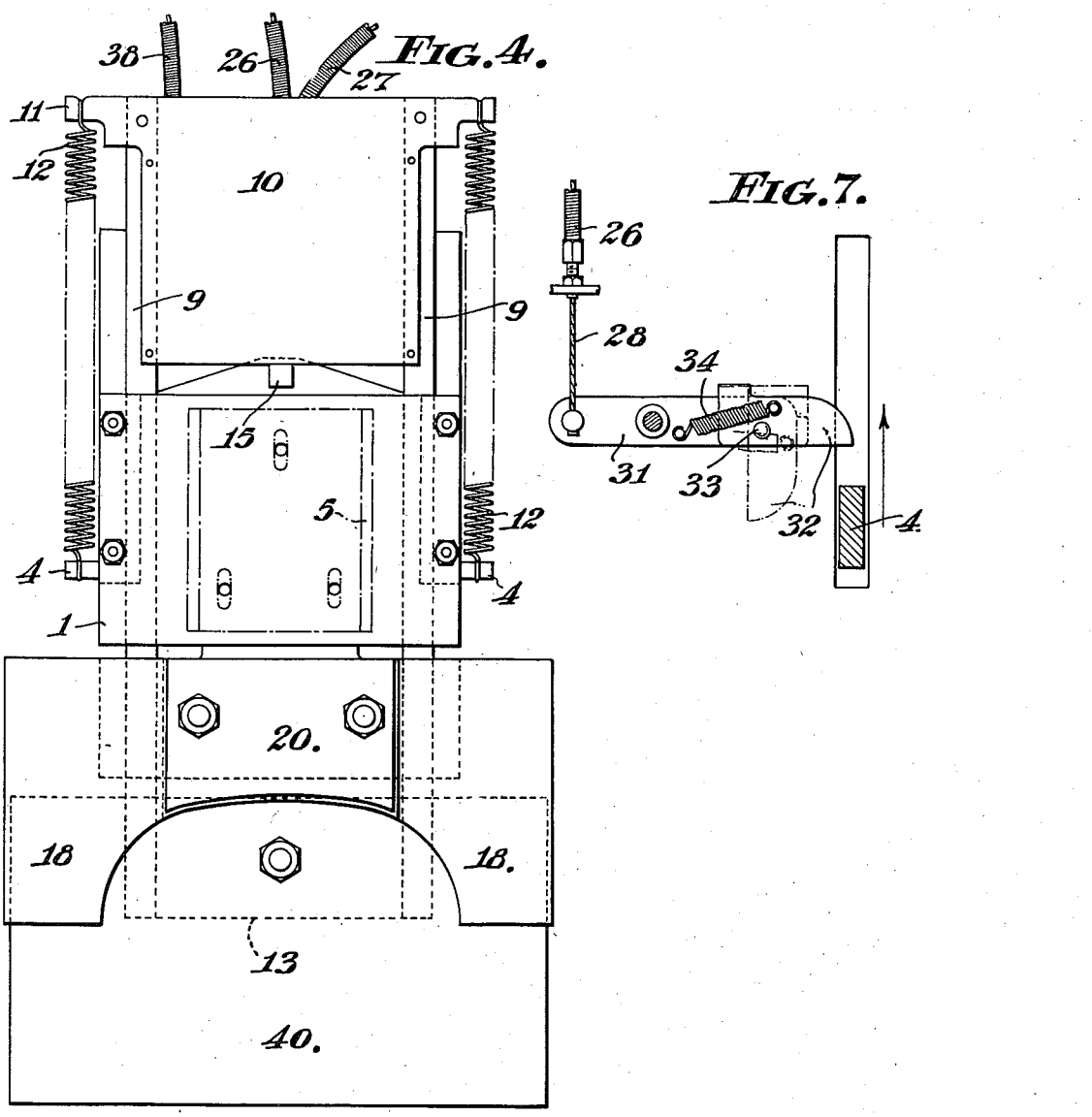
INVENTOR
GUSTAVE S. CROOME
By William... Groff
Attys

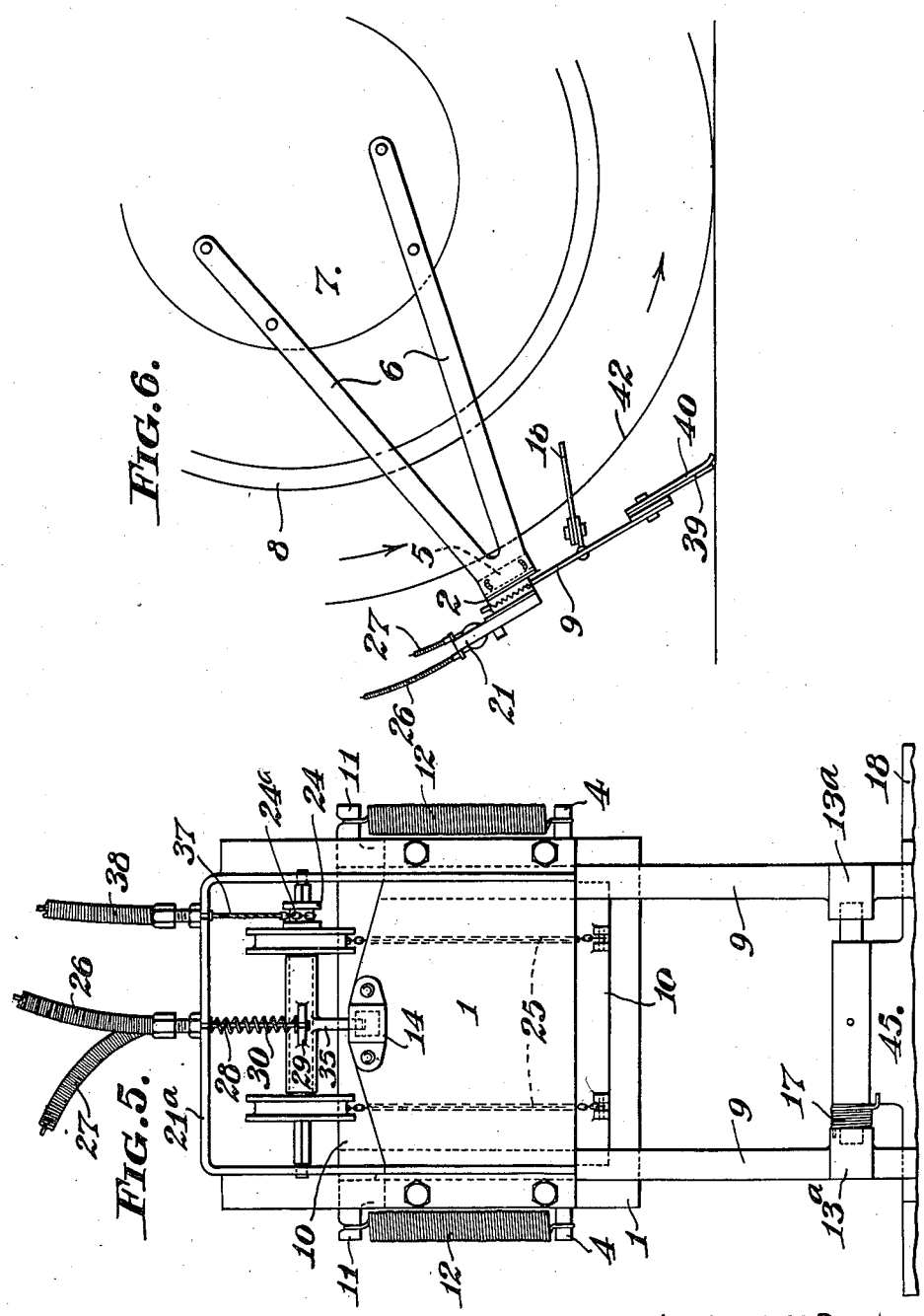

Patented May 20, 1941

2,242,348

UNITED STATES PATENT OFFICE 2,242,348

ANTISKID DEVICE FOR AUTOMOBILES

Gustave Sydney Croome, Mitcham, England

Application August 2, 1940, Serial No. 349,813
In Great Britain July 19, 1939

9 Claims. (Cl. 280—158)

This invention relates to antiskid devices for automobiles, and provides a device which functions to effect not only the wiping of the tires but also the clearing away of mud and other matter and the wiping of the ground directly in front of the wheels of an automobile and thereby prevent the skidding thereof on which would otherwise be a slippery surface.

According to the invention there is provided an antiskid device for automobiles comprising a unit adapted to be supported in front of a road wheel of the vehicle, a road wiping and drying device movably carried by said unit and adapted in one position to contact with the road surface in front of the said wheel, a tire scraper movably carried by said unit and adapted in one position to wipe the wheel tire, and operating means arranged to simultaneously position the said road wiper and tire scraper to perform their respective operations.

Conveniently the device may comprise a frame disposed in front of a wheel of the automobile and supported from the brake drum of the wheel and having vertically slidable therein a spring-loaded slider incorporating a spring-controlled tire scraper and a squeegee, a spring-pressed catch on said frame for holding the slider in normal raised position, and means co-acting with said catch and operably connected by a Bowden or other flexible cable connected to a strip adapted to be actuated by the brake lever of the automobile for retracting the catch and permit of the downward movement of the slider to contact with the ground.

The above arrangement is such that, on the brake lever being actuated, the catch is disengaged from the slider which, by the contraction of its spring, instantly slides downwardly with the result that the scraper swings out rearwardly and contacts with and wipes the tire of the wheel, whilst the lower ends of both the squeegee and its reinforcement contact with the ground, the said reinforcement clearing away mud from in front of the squeegee which wipes the ground immediately in front of the tire of the wheel, said squeegee being capable of a lateral swinging movement.

In use, a set of four of these devices, of which only one is directly actuated by the brake lever, is employed and disposed one in front of each wheel of the automobile, the catch release means of the second device being operably connected to the catch release means of the first device, and the catch release means of the second device operably connected to the catch release means of the third device whose catch release means is operably connected to the catch release means of the fourth device so that, when the hand brake lever is actuated, all the said devices function simultaneously.

For a ready understanding of the invention, reference is to be had to the following description and accompanying sheet of drawings illustrative of an embodiment of the invention, and wherein:

Figure 1 is a front elevational view of the device, the same being in normal raised position;

Figure 2 is a vertical sectional view taken on line 2—2 of said Figure 1,

Figure 3 is a sectional plan view taken on line 3—3 of said Figure 1,

Figure 4 is a rear elevational view of the device shown in Figure 1,

Figure 5 is a front elevational view of the device, the same being in its operative position, and Figure 6 is a diagrammatic side view illustrative of the application of the invention.

Figure 7 is a view illustrative of the trip hereinafter referred to.

Like numerals of reference indicate corresponding parts in the several figures.

In carrying out the invention, and referring to the drawings, there is provided a frame constituted by front and rear plates 1, 1 fixedly secured to the front and rear faces of two spaced-apart uprights 2, 2 each having in its inner face a vertical guide-way 3, and on its lower end a laterally extending lug 4, the said rear plate 1 extending beyond the lower edge of the front plate 1 aforesaid.

The rear plate 1 aforesaid is adjustably connected, for vertical movement, to a channel-section plate 5 which is adjustably connected for arcuate movement, to the apex end of a V-like member 6 fixedly secured to the brake drum cover plate 7 of a wheel 8, as shown in Figure 6.

In the guides 3 aforesaid is slidably mounted the slider of the device, said slider consisting of uprights 9 slidable in the guides 3, and which are at their upper end fixedly secured to a plate 10 having at its upper end laterally projecting lugs 11 to which, and to the lugs 4 of the frame, are anchored coiled tension springs 12, whilst the lower ends of the said uprights 9 are fixedly secured to a plate 13. Fixedly connected to the upper end of the front plate 1 of the frame, and centrally in the width of said plate 1, is a housing 14 in which is slidable a spring-pressed catch 15 whose front end is adapted to be engaged with the bottom end of the plate 10 of the slider and retain the same in normal raised position, and with the springs 12 tensioned as shown in Figures 1 and 4.

In aligning lugs 13a on the opposed uprights 9 of the slider, there is pivotally mounted, by its spindle 4, a plate 5 adapted to be outwardly rearwardly swung by means of a coiled spring 17, and to said plate 4 there is secured, by bolts and nuts 16, the tire scraper of the device, said scraper being constituted by two sheets 18 preferably of rubber similar in size and shape and which overlap one another, as shown in Figure 4 and present an arched recess 19 in their lower parts, a cover plate 20 being interposed between the securing nuts and the rear plate 18.

To the front plate 1 of the frame are fixedly secured the arms 21 of an inverted U-member, and in said arms 21 is rotatably mounted a spindle 22 on which is freely mounted a centrally disposed T-shaped member. A pulley 23 disposed at each side of the said member, and a small drum 24 positioned beside one pulley are mounted on squared portions of the shaft to turn solid therewith, each pulley 23 having affixed thereto a chain 25 which is anchored to the lower end of the upper plate 10 of the slider, as shown in Figures 1, 2 and 3.

To the bight 21a of the inverted U-member aforesaid are connected two Bowden cables, respectively 26 and 27, and the operating wire 28 of the cable 26 is fixedly connected to the front and horizontally disposed arm 29 of the T-member, a coiled spring 30, which encircles the wire 28 being interposed between said arm 29 and the bight 21a of the U-member. The other end of the wire 28 is connected to the rear end of a pivotally mounted arm 31, see Figure 7, having a nose 32 pivotally connected at 33 to the front end of the arm 31 and normally maintained in line with said arm by means of a spring 34 which is anchored both to the arm 31 and to the nose 32 aforesaid.

The lower end of the vertically depending arm 35 of the T-member aforesaid engages in a slot 15a in the catch 15 which is normally forwardly pressed by a spring 15b located in the housing 14 on the front plate 1 of the frame. Further, the operating wire 27a of the cable 27 is connected to the rear horizontal arm 36 of the T-member aforesaid, the other end of the said wire 27a being connected to the front horizontal arm of the T-member of another similar device, not shown in the drawings, and the same applies to the other two devices of the set of devices.

To the drum 24 on the spindle 22 of the T-member is attached a chain 24a to which is connected the operating wire 37 of another Bowden cable 38 which is also affixed to the bight 21a of the inverted U-member, the other end of said wire 37 being connected to a control handle operable by the driver of the automobile.

Further, to the bottom plate 13 of the slider there is connected the road scraper of the device, said scraper being constituted by a fibre front plate 39 backed by a sheet of rubber 40, said rubber 40 extending beyond the lower end of the fibre plate 39 aforesaid.

*Working of the antiskid device*

On the brake lever 41, see Figure 7, being forwardly pushed, it contacts with the nose 32 of the arm 31 and cants the same, and then slips past said nose 32, with the result that the wire 28 pulls on the arm 29 of the T-member and thereby causes the arm 35 of said T-member to retract the catch 15 against the action of its spring 15b from under the lower end of the upper plate 10 of the slider, whereupon the springs 12 function to contract and downwardly pull the said slider into the position shown in Figures 5 and 6, and as the upper end of the plate 4, which carries the scraper, clears the lower end of the rear plate 1 of the frame, said scraper is, by the spring 17, outwardly and rearwardly swung so that the recess 19 of said scraper contacts with the tire 42 of the well 8, whilst, at the same time, the lower edge of the fibre plate 39 contacts with and clears the ground in front of the rubber 40, whose lower end is rearwardly bent and wipes the ground immediately in front of the tire 32 aforesaid. The turning of the T-member at the same time effects, through its arm 36 and the wire 27a of the cable 27, the simultaneous release of the catch of another device of the set of devices, and the same applies to the other devices of the set.

To return the slider into its normal raised position again, the wire 37 of the cable 38 is actuated the reverse rotation of the pulleys 23, with consequent winding thereonto of the chains 25 and the raising of the slider, the upper end of the upper plate 10 thereof pushing back the catch 15 which remains pushed back until the lower end of said plate 10 slips past the nose of the catch which then engages under said lower end of the plate 10. The tire scraper is also returned to its "in" position by reason of the upper part of the plate 5 contacting with the lower end of the rear plate 1 of the frame of the device.

The hand or foot-brake lever, when moved backwardly tilts and then slips past the nose 32 of the arm 31 and nose 32 springs back to normal position, but when the antiskid device is not required to be used, then the said nose 32 is swung down clear of the hand or foot lever 41 and maintained in such position by the spring 34, leaving the hand lever unobstructed for ordinary use.

I claim:

1. An antiskid device for automobiles comprising a unit adapted to be supported in front of a road wheel of the vehicle, a road wiping and drying device movably carried by said unit and adapted in one position to contact with the road surface in front of the said wheel, a tire scraper movably carried by said unit and adapted in one position to wipe the wheel tire, and operating means arranged to simultaneously position the said road wiper and tire scraper to perform their respective operations.

2. An antiskid device for automobiles consisting of a frame disposed in front of a wheel of the automobile and supported from the brake drum of the wheel, and having vertically slidable therein a spring-loaded slider incorporating a spring controlled tire scraper and a squeegee, a spring-pressed catch on said frame for holding the slider in normal raised position, and means co-acting with said catch and operably connected by a flexible cable connected to a trip adapted to be actuated by the brake lever of the automobile for retracting the catch and permit of the downward movement of the slider to ground-contacting position.

3. An antiskid device for automobiles consisting of a set of devices disposed one in front of each wheel of the automobile and supported from said wheel, said device being constituted by a frame in which is slidable a vertically disposed slider having a spring-controlled tire scraper and a squeegee having a reinforced front face, a spring-pressed catch mounted on the frame for retaining the slider in normal raised position, means for releasing said catch to allow of the fall of the slider with consequent functioning of the scraper and reinforced squeegee, the releasing means of all of the devices being interconnected with one another, and one of said releasing means being operably connected by a flexible cable to a trip adapted to be actuated by the brake lever of the automobile so that the set of devices function simultaneously.

4. An antiskid device according to claim 2, wherein the frame consists of spaced uprights fixedly connected together by front and rear plates, and the inner faces of the uprights are grooved for the slidable reception of the slider the same being constituted by spaced uprights fixedly connected together by a plate at their upper and lower ends, and the upper plate of the slider has laterally extending lugs which are coupled by means of tension springs to laterally extending lugs on the lower ends of the uprights of the frame, and the catch engages under the lower end of the upper plate of the slider to hold the same in raised position so that the springs aforesaid are normally fully tensioned.

5. An antiskid device according to claim 2, wherein the scraper is constituted by a plate fixedly carried by a spindle pivotally mounted in aligning lugs on the inner faces of the uprights of the slider and spring-controlled, and two sheets preferably of rubber which overlap one another, are bolted to the rear face of the pivoted plate and at their lower and central parts are shaped to provide an arched recess and wherein the frame consists of spaced-apart uprights fixedly connected together by front and rear plates, and the inner faces of the uprights are grooved for the slidable reception of the slider the same being constituted by spaced-apart uprights fixedly connected together by a plate at their upper and lower ends, and the upper plate of the slider has laterally extending lugs which are coupled by means of tension springs to laterally extending lugs on the lower ends of the uprights of the frame, and the catch engages under the lower end of the upper plate of the slider to hold the same in raised position so that the springs aforesaid are normally fulled tensioned.

6. An antiskid device according to claim 2, wherein the reinforced squeegee consists of a fibre plate and a sheet of rubber on the rear face of the fibre plate, said rubber extending beyond the lower end of the fibre plate, said rubber and fibre plate being pivotally mounted on the rear face of the lower plate of the slider and wherein the frame consists of spaced-apart uprights fixedly connected together by front and rear plates, and the inner faces of the uprights are grooved for the slidable reception of the slider the same being constituted by spaced-apart uprights fixedly connected together by a plate at their upper and lower ends, and the upper plate of the slider has laterally extending lugs which are coupled by means of tension springs to laterally extending lugs on the lower ends of the uprights of the frame, and the catch engages under the lower end of the upper plate of the slider to hold the same in raised position so that the springs aforesaid are normally fully tensioned.

7. An antiskid device according to claim 2, wherein the catch releasing means consists of a T-member carried by a spindle pivotal in the vertical arms of an inverted U-member fixedly secured to the front plate of the frame, the vertical leg of the T engaging in a slot in the spring-pressed catch, whilst the front horizontal arm of the T is connected by the flexible cable to the trip and the rear horizontal arm of the T is connected by a flexible cable to the release means of another device of the set of devices and wherein the frame consists of spaced-apart uprights fixedly connected together by front and rear plates, and the inner faces of the uprights are grooved for the slidable reception of the slider the same being constituted by spaced-apart uprights fixedly connected together by a plate at their upper and lower ends, and the upper plate of the slider has laterally extending lugs which are coupled by means of tension springs to laterally extending lugs on the lower ends of the uprights of the frame, and the catch engages under the lower end of the upper plate of the slider to hold the same in raised position so that the springs aforesaid are normally fully tensioned.

8. An antiskid device according to claim 2, wherein pulleys are mounted on the pivotal spindle and disposed one each side of the T-member thereon, each pulley carrying a chain which is anchored to the lower end of the upper plate of the slider and wherein the frame consists of spaced-apart uprights fixedly connected together by front and rear plates, and the inner faces of the uprights are grooved for the slidable reception of the slider the same being constituted by spaced-apart uprights fixedly connected together by a plate at their upper and lower ends, and the upper plate of the slider has laterally extending lugs which are coupled by means of tension springs to laterally extendings lugs on the lower ends of the uprights of the frame, and the catch engages under the lower end of the upper plate of the slider to hold the same in raised position so that the springs aforesaid are normally fully tensioned and further wherein the catch releasing means consists of a T-member carried by a spindle pivotal in the vertical arms of an inverted U-member fixedly secured to the front plate of the frame, the vertical leg of the T engaging in a slot in the spring-pressed catch, whilst the front horizontal arm of the T is connected by the Bowden wire to the trip and the rear horizontal arm of the T is connected by a flexible wire to the release means of another device of the set of devices.

9. An antiskid device according to claim 2, wherein the trip is constituted by a horizontally disposed pivotally mounted arm having at its front end a pivotally mounted one-way acting spring-controlled nose, the rear end of the said arm being connected to the wire which is connected to the front arm of the releasing means.

GUSTAVE SYDNEY CROOME.